United States Patent
Soleimani et al.

(10) Patent No.: US 6,373,858 B1
(45) Date of Patent: Apr. 16, 2002

(54) BURST FORMAT AND ASSOCIATED SIGNAL PROCESSING TO IMPROVE FREQUENCY AND TIMING ESTIMATION FOR RANDOM ACCESS CHANNELS

(75) Inventors: Mohammad Soleimani, Rockville; A. Roger Hammons, Jr., North Potomac; Zheng-Liang Shi; Yash Vasavada, both of Germantown; Moe Rahnema, Bethesda; Yezdi Antia, Gaithersburg, all of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/110,035

(22) Filed: Jul. 2, 1998

Related U.S. Application Data

(60) Provisional application No. 60/044,753, filed on Apr. 21, 1997.

(51) Int. Cl.[7] .................................................. H04J 3/00
(52) U.S. Cl. ........................................ 370/476; 370/512
(58) Field of Search ................................ 370/476, 503, 370/321, 324, 326, 330, 336, 337, 347, 349, 350, 210, 458, 504, 509–10, 511–14, 525–6

(56) References Cited

U.S. PATENT DOCUMENTS

| | | | | |
|---|---|---|---|---|
| 4,868,811 A | * | 9/1989 | Suzuki ........................ | 370/436 |
| 5,471,501 A | * | 11/1995 | Parr et al. .................... | 375/354 |
| 5,742,612 A | * | 4/1998 | Gourgue et al. ............ | 714/701 |
| 5,761,197 A | * | 6/1998 | Takefman .................... | 370/337 |
| 5,974,091 A | * | 10/1999 | Huff ............................ | 375/265 |

OTHER PUBLICATIONS

ICP PCR Systems Functional Analysis (SFA) Chapter 10 Estimation, Coding, and Modulation Part I, Dr. Roger Hammons, May 1997 pp 1–14.

* cited by examiner

Primary Examiner—David R. Vincent
(74) Attorney, Agent, or Firm—John T. Whelan; Michael W. Sales

(57) ABSTRACT

A message format and associated method for estimating the frequency and timing offset of a reference burst of a random access channel in a time-division multiple access communications system. A signal structure in which the continuous wave segment is split into two parts separated by some portion of the content of the random access channel burst is used to provide more precise frequency estimation. Iteration of separate frequency and timing estimation procedures is used to refine both estimates, as the individual estimation processes are more accurate when there is less error in the other parameter. Multiple hypothesis testing is used, in which more than one initial frequency estimate is carried through the iteration process, with thresholding to identify the best frequency offset. Reliable rejection of false ambiguities is achieved because the degradation in timing estimation, due to large frequency offsets, can be detected with thresholding.

25 Claims, 7 Drawing Sheets

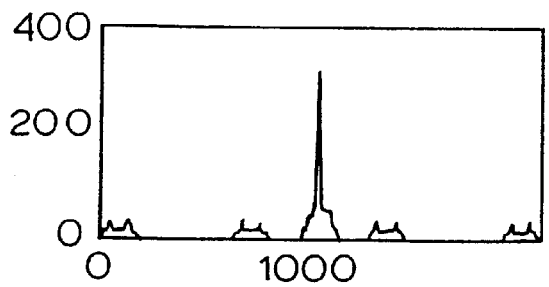 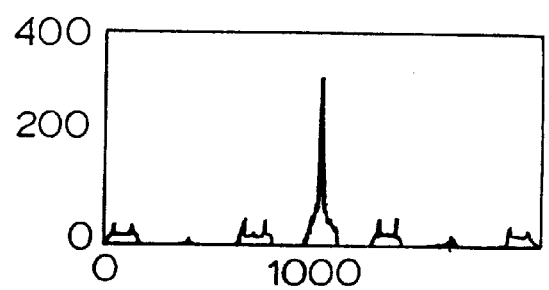
FIG. 7A  FIG. 7B
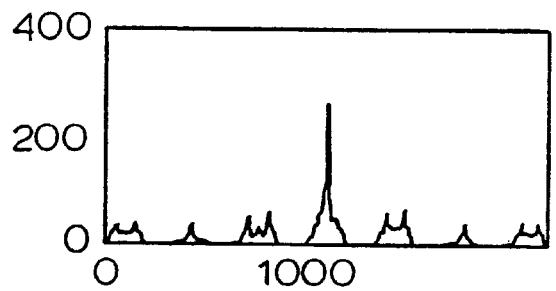 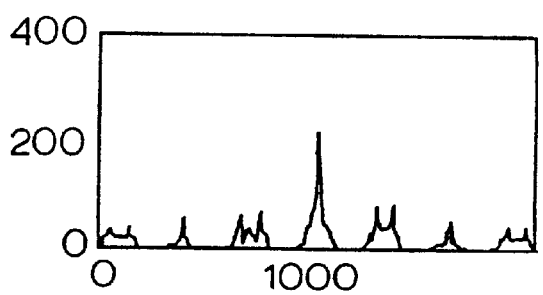
FIG. 7C  FIG. 7D
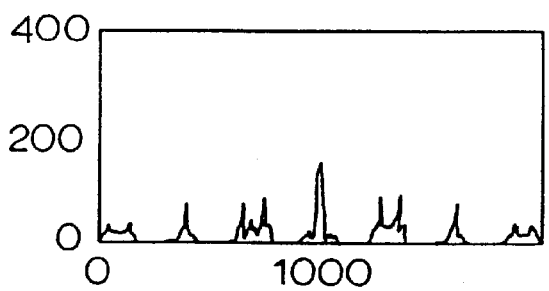 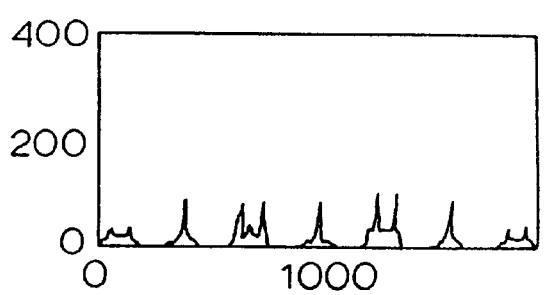
FIG. 7E  FIG. 7F

BURST FORMAT AND ASSOCIATED SIGNAL PROCESSING TO IMPROVE FREQUENCY AND TIMING ESTIMATION FOR RANDOM ACCESS CHANNELS This application claims benefit of Prov. No. 60/044,753 filed Apr. 21, 1997.

TECHNICAL FIELD OF THE INVENTION

The present invention relates in general to time-division multiple-access communications and in particular to frequency and timing estimation for burst acquisition of random access channels.

BACKGROUND OF THE INVENTION

Several communication techniques are well suited for applications where a number of independent users need to share a common band of frequencies without the benefit of an external synchronizing mechanism, such as in time-division multiple access (TDMA) cellular radio and satellite systems. TDMA is a digital radio frequency signaling technique, in which the transmission of a message occupies the communication channel for only a fraction of the total time (i.e., a time slot 22), in a periodic fashion, thus allowing other users access to the same spectrum on a time-shared basis.

In order to achieve this sharing of the spectrum, TDMA systems rely on tight synchronization of time bases, between transmitter and receiver, to enable communication. To synchronize the stations, each time slot 22 begins with a reference burst.

In an ideal system, the receiver knows that a burst always arrives at the beginning of a slot at a known radio frequency (RF) and prepares to detect it at the beginning of each slot. However, due to a multitude of factors such as propagation delay differences among users at different locations, Doppler shift, and oscillator drift, the offset of the arrival time relative to the expected time and the actual radio frequency of the random access channel burst have a wide range of uncertainty. Therefore, a large detection window in both time and frequency must be processed to look for the burst. Current transmissions begin each data frame (i.e., a complete period comprising one time slot from each transmitter) with a preamble containing a synchronization pattern. The receiving system attempts to detect this pattern, by looking for spectral energy in certain frequency bins (i e., a series of adjacent frequency ranges), and then estimates the frequency and timing using interpolation.

However, these systems are often inaccurate, and extraneous signals (e.g., noise) can cause the receiver to fail to detect the random access channel burst when present, erroneously detect a burst when none is present, or successfully detect the burst but fail to estimate the correct timing or frequency offset from the expected timing and/or frequency offset, thereby losing data. What is needed, therefore, is an improved method of estimating the frequency and timing offsets of a random access reference burst.

SUMMARY OF THE INVENTION

The present invention relates to communication systems that use a reference burst to synchronize a receiver with a transmitter. The present invention describes a message format and associated method to improve the accuracy of estimating the frequency and timing offset, during initial burst acquisition of a random access channel, in a time-division multiple access communications system.

In accordance with one aspect of the present invention, a novel signal structure is shown in which a continuous wave (CW) segment used primarily for frequency estimation is separated into at least two parts separated by some portion of the content of the random access channel burst to provide more precise frequency estimation. Increased precision in frequency estimation is achieved as a result of having longer periods of time over which to measure the time rate of change of the phase of the CW signal.

In accordance with another aspect of the present invention, iteration of separate frequency and timing estimation procedures is used to refine both estimates, as the individual estimation processes are more accurate when there is less error in the other estimate. This method detects the presence of random access channel bursts by correlating the frequency of the continuous wave segment of an incoming data packet with the expected frequency of the burst. This is accomplished with a plurality of filters near the expected frequency, configured to alert the system when a preset threshold is exceeded. The center frequency of the detection filter provides the receiver with a coarse estimate of the unknown frequency offset. A coarse timing estimate is obtained by continuing to monitor the detection filter after the alert and determining the sample point of the peak filter response. The frequency estimation is refined by interpolating the filter response from the detection filter and its neighbors at the acquired sampling time. The timing estimation is refined by correlating the frequency corrected received data against a template representing both the continuous wave and unique word segments. Because the accuracy of the fine timing estimation depends on the residual frequency error and vice versa, the fine timing and fine frequency estimations are performed iteratively.

In accordance with yet another aspect of the present invention, multiple hypothesis testing is used, in which more than one initial frequency estimate is carried through the iteration process, with thresholding to identify the best frequency offset. Reliable rejection of false ambiguities is accommodated since the degradation in timing estimation due to large frequency offsets can be easily detected with thresholding.

The present invention provides significant increases in the precision of timing and frequency offset estimations, when acquiring random access channels using a reference burst, by separating the continuous wave portion of the message, iterating between frequency and timing estimates, and carrying multiple hypotheses through the iteration process.

BRIEF DESCRIPTION OF THE DRAWINGS

These and other features and advantages of the present invention will become more apparent from a detailed consideration of the invention when taken in conjunction with the drawings in which:

FIG. 7 illustrates the time correlation of unique word with frequency effect as a parameter.

DETAILED DESCRIPTION

By the way of example only, the message format and method of the present invention is used to accurately estimate the frequency and timing of an initial burst of a TDMA signal in order to synchronize a transmitter with a receiver. It should be understood, however, that any communication system requiring frequency or timing estimation may alternatively employ the techniques shown herein. Such systems might include other coded communications techniques not traditionally referenced as TDMA. For example, a cordless telephone handset and base having independent clocks could employ the present invention. Generally, however, the techniques of the present invention are best used by frequency divided or time slotted messaging systems employing a transmitter and receiver pair that can benefit from an accurate frequency and timing estimate.

Generally, the present invention estimates the frequency and timing of an incoming burst by detecting the burst using coarse filtering, estimating the frequency as the center of the coarse bin in which the burst was detected, estimating the timing by the time of peak coarse detection, and refining the estimates through iteration and interpolation. Gross errors are eliminated by carrying multiple hypotheses and correlating each against a unique word. This iterative multi-hypothesis technique, combined with the unique split continuous wave message format, achieve the improvements in accuracy of frequency and timing estimation of the present invention.

Figure 1:
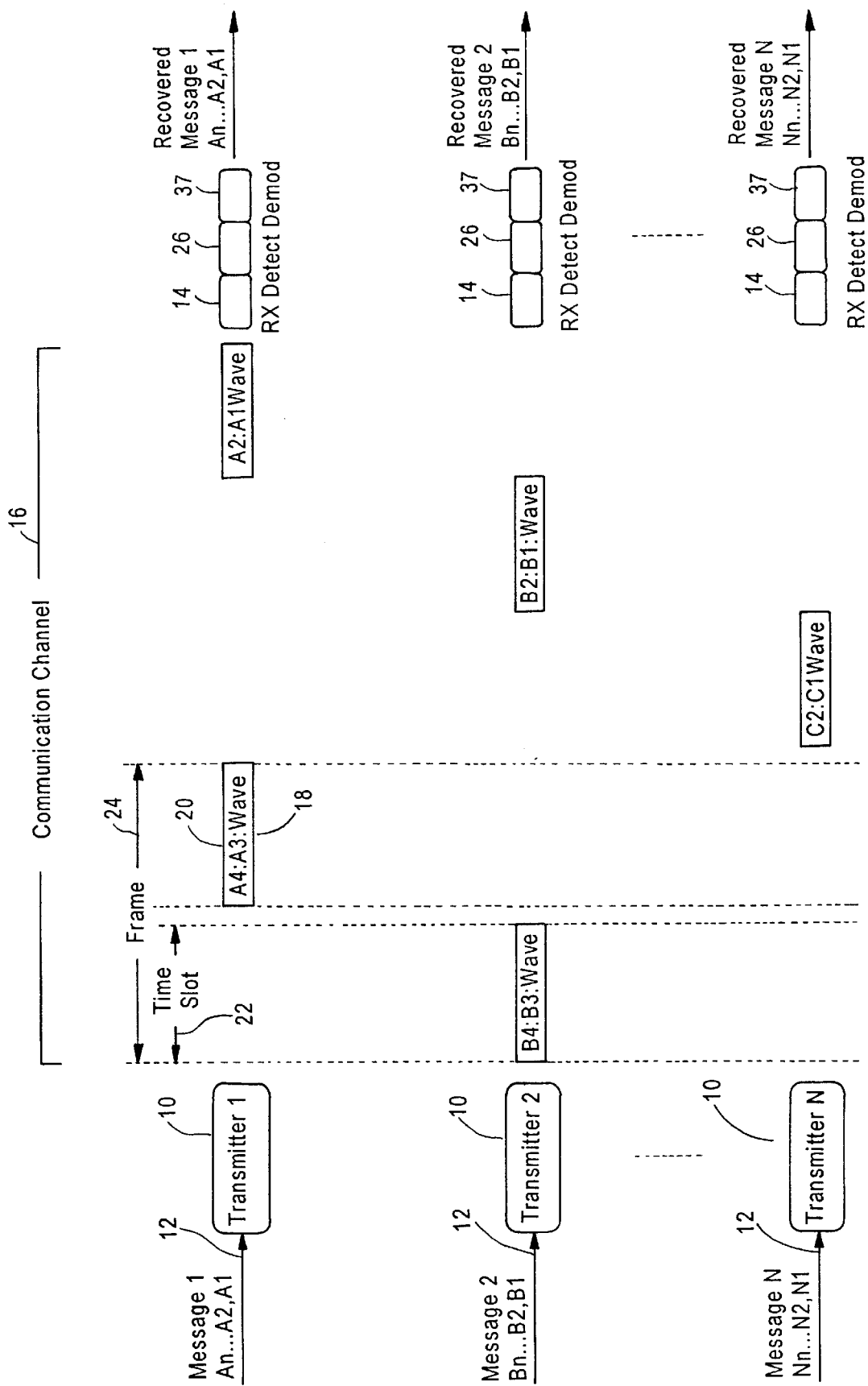
FIG. 1 is a block diagram of a typical time-division multiple access communication system which relies on the use of a continuous wave reference burst to synchronize communication and is capable of utilizing the present invention.

Illustrated in FIG. 1 is a typical time-division multiple access communication system capable of implementing the present invention. One or more transmitters 10 sends a message 12 to one or more receivers 14 (e.g., antenna, satellite dish, cable-type decoder, fiber optic detector, electrical circuit, etc.) through a communication channel 16 (e.g., hardwire connection, fiber optic cable, satellite relay, etc.). A portion of the message 12 and a continuous wave preamble 18 are combined into packets 20 and transmitted during a time slot 22 in a frame 24. The receiver 14 knows approximately what time and at what frequency to recover the message 12 if sent; however, for random access messages, it is not known a priori when a user will request access, so timing and frequency offsets can be significantly larger than would be the case for ongoing continuous communication between the transmitter and receiver. In addition, there is no common clock between the transmitter 10 and the receiver 14, therefore the receiver 14 must acquire timing and frequency synchronization directly from the incoming data packets 20. The continuous wave 18 and unique word (UW) (shown in FIGS. 3 and 4) portions of the random access message 20 are reference signals that are used by a detection circuit 26 to perform timing and frequency synchronization.

Figure 2:
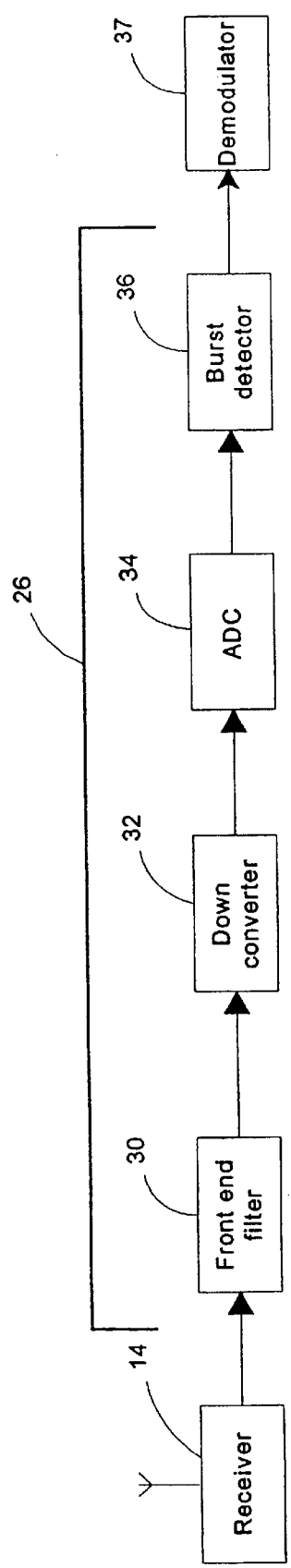
FIG. 2 is a block diagram showing more detail of the detection circuit of FIG. 1 according to the preferred embodiment of the present invention.

Illustrated in FIG. 2 is a block diagram of the detection circuit 26 according to the preferred embodiment of the present invention. The packets 20 of FIG.1 are captured by the receiver 14 and sent through a filter 30 to eliminate out of band signals. The filtered signal is down converted at a block 32 and fed to an analog to digital converter 34 before going to a burst detector 36. Well known burst detectors 36 include programmed digital signal processors (DSPs) and/or application specific integrated circuits (ASICs). The burst detector 36 is responsible for determining when a reference burst has occurred and estimating from the sampled burst the frequency, timing, and phase offsets required by the receiving system's demodulator. The accuracy of these estimates is important to the system's ability to communicate and is the subject of the present invention. Subsequently, the signal is recovered by a demodulator 37.

Figure 3:
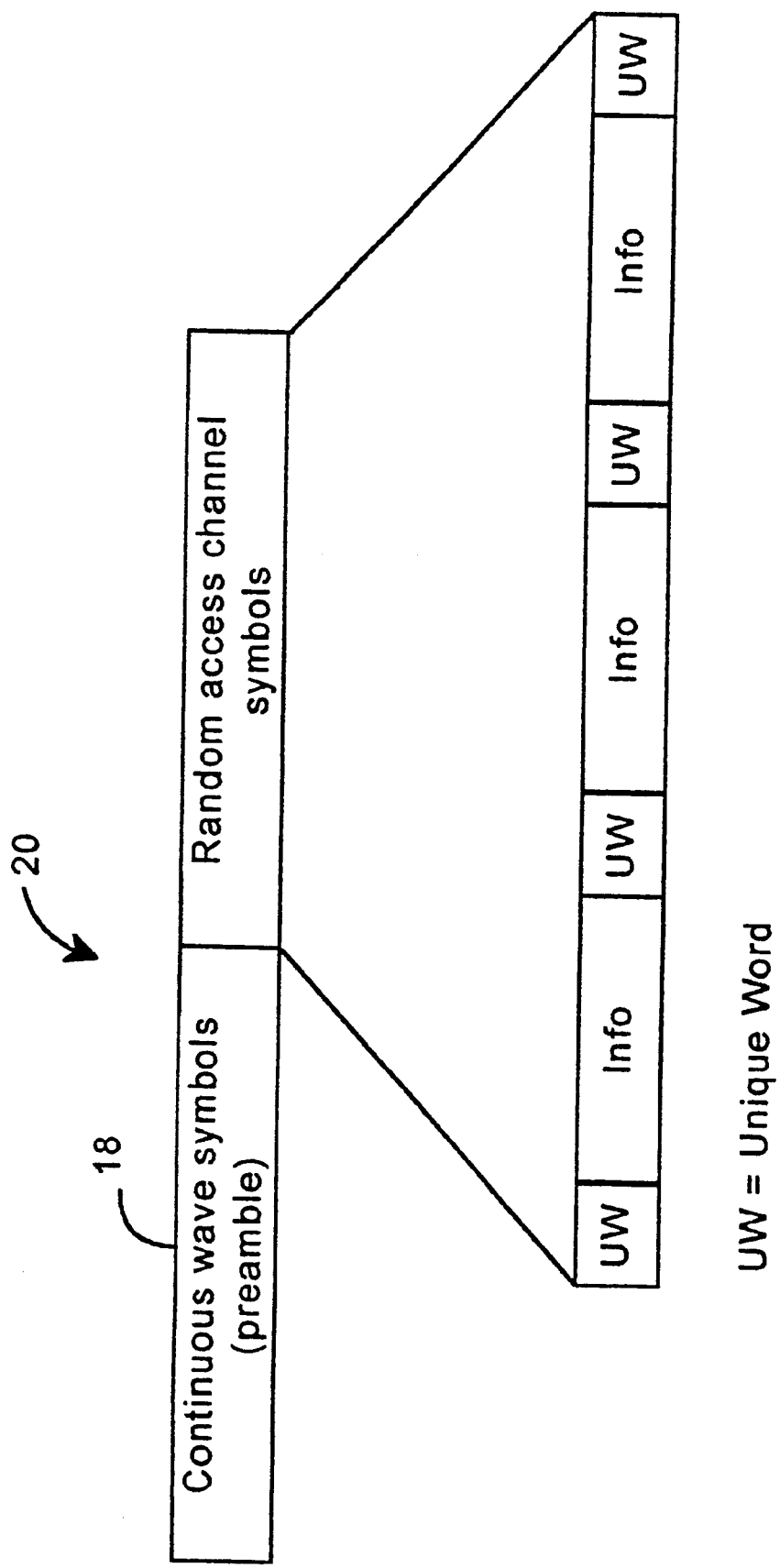
FIG. 3 is a message diagram showing more detail of the traditional random access channel message format, with contiguous continuous wave preamble, of FIG. 1.

Illustrated in FIG. 3 is a traditional reference burst message format with all the symbols of the continuous wave segment 18, used for frequency estimation, coming contiguously as a preamble at the beginning of the message. The difference between the expected frequency and the received frequency, required to decode the message, can be estimated as the time rate of change in phase shift over the duration of the continuous wave segment 18. The longer the expected continuous wave segment 18, the more accurately the frequency offset can be estimated. However, increasing the size of the continuous wave segment 18 leaves less time available to transmit message packets.

Figure 4:
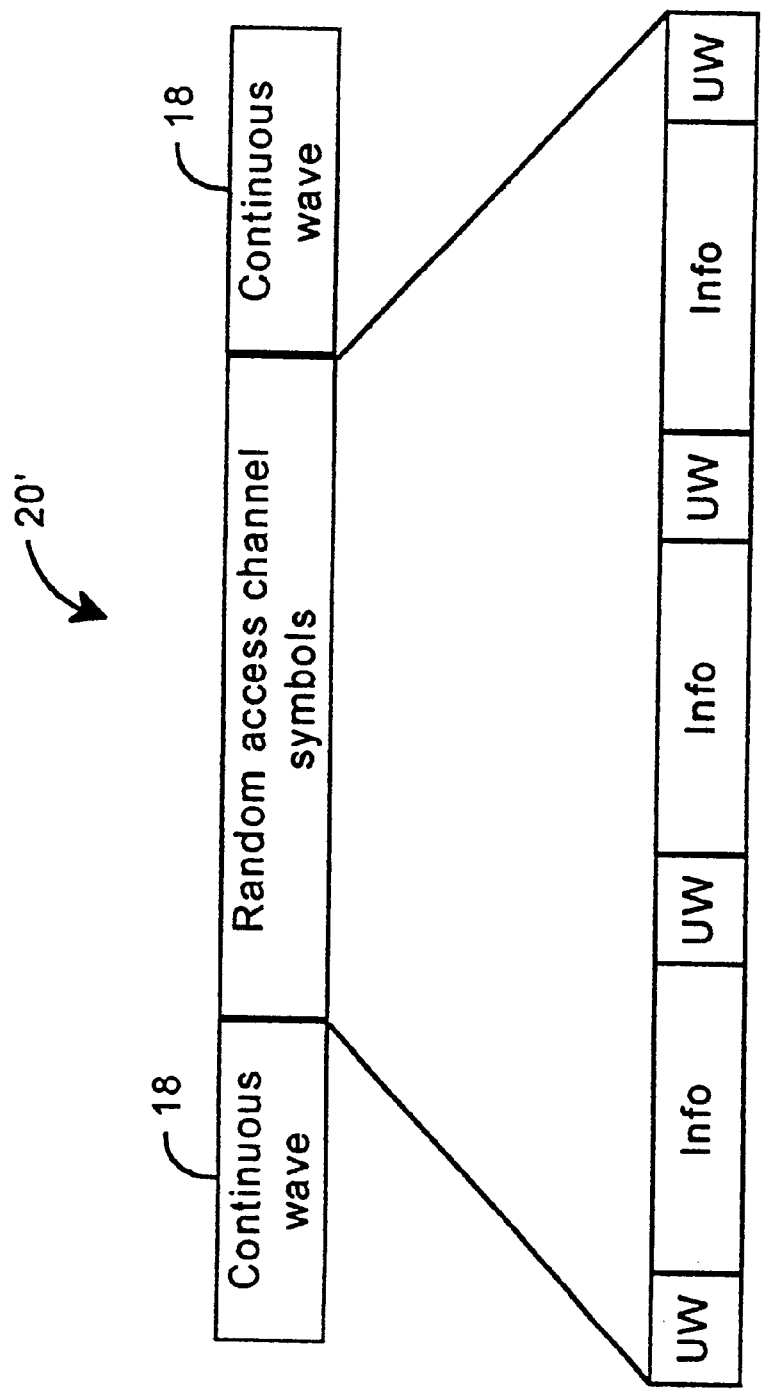
FIG. 4 is a message diagram of a random access channel format with a split continuous wave segment according to the preferred embodiment of the present invention.

Illustrated in FIG. 4 is a non-traditional reference burst message format 20', according to the preferred embodiment of the present invention. The continuous wave segment 18 is split, half coming at the beginning and the other half at the end of the message data packet 20'. Increased precision in frequency estimation is achieved by the split CW signal format as a result of observing the time rate of change of phase over a longer observation window, even though the total duration of the CW signal itself does not change. The random access channel symbols consist of information symbols and unique words (UW) symbols which are used for the timing estimation. The UW symbols are separated into a few portions instead of grouping them together to achieve better channel estimation.

Figure 5:
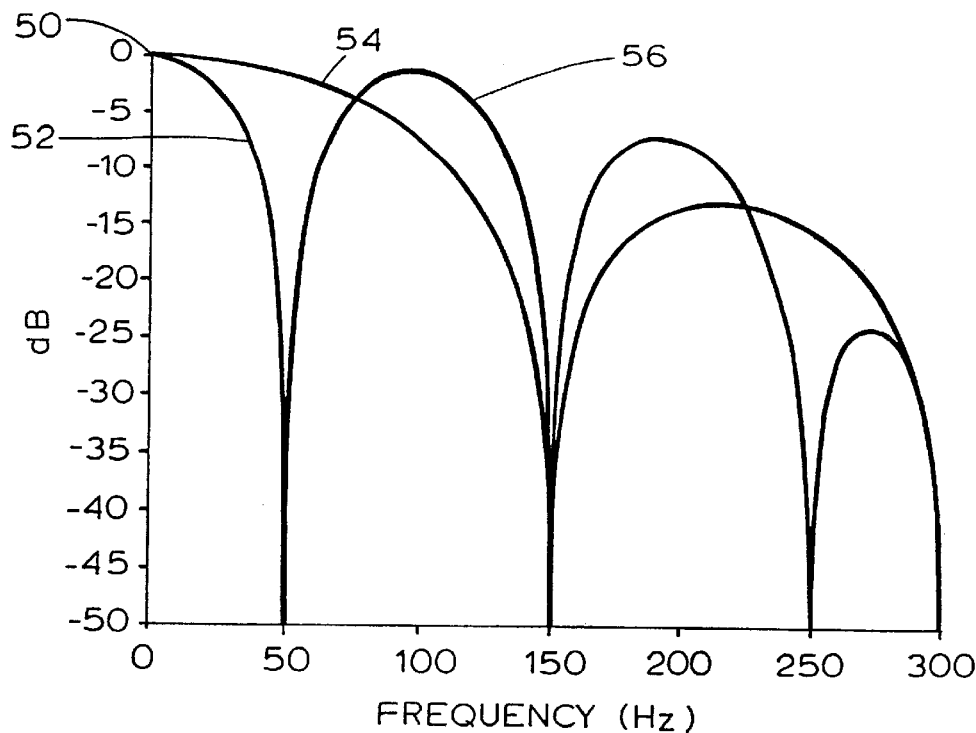
FIG. 5 is an ideal plot of the spectra for the contiguous and split random access channel formats of FIG. 3 and FIG. 4.

FIG. 5 illustrates the spectra for both the contiguous continuous wave format of FIG. 3 and the split continuous wave format, according to the preferred embodiment of the present invention, of FIG. 4. The mainlobe peak 50 occurs at the receive frequency to be estimated. The width of the mainlobe 50 is smaller for the split continuous wave spectra 52 than it is for the contiguous continuous wave spectra 54, resulting in better resolution for the frequency estimation, because the variance is reduced. However, there are additional lobes 56 in the vicinity of the mainlobe 50 for the split continuous wave spectra 52. In a noisy environment, it is possible that one of these near lobes 56 will have a higher amplitude than the true mainlobe 50. In order to retain the advantages of the increased resolution and reduced variance and eliminate the potential that the estimator would be confused and pick the wrong lobe, resulting in a biased frequency estimate (click noise spike 60 of FIG. 6), a more sophisticated algorithm is used to estimate the frequency and timing of the incoming signal, as illustrated in FIG. 8.

Figure 6:
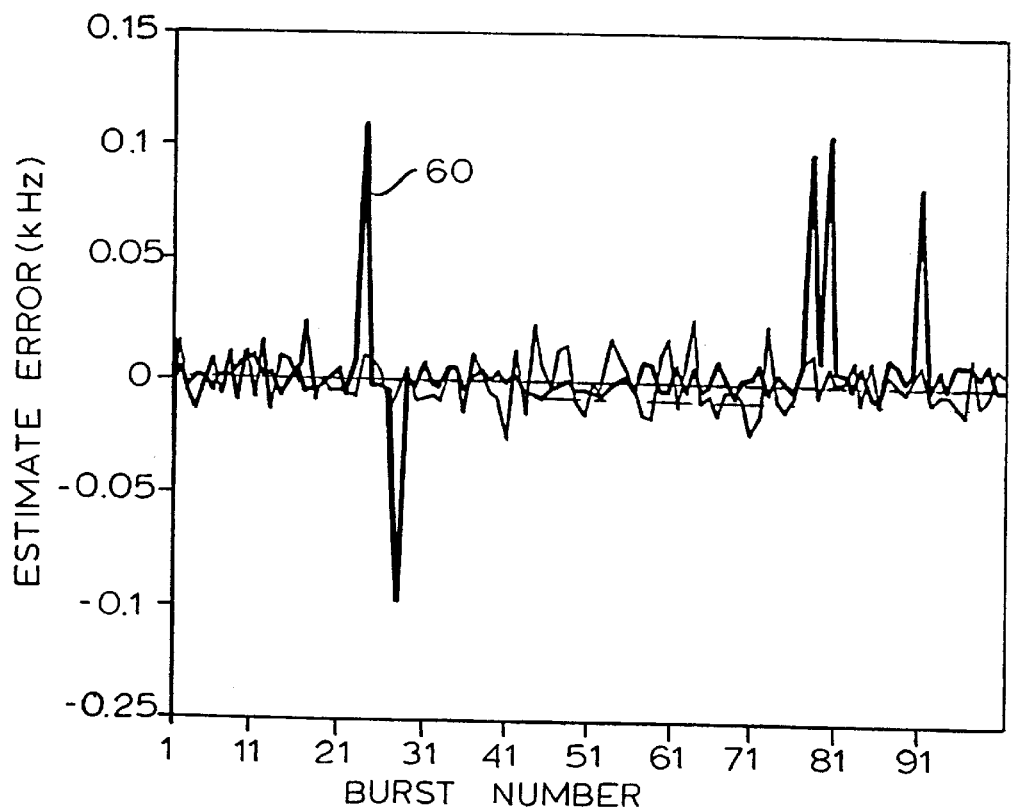
FIG. 6 is a simulation plot showing click noise spikes and improved frequency estimates of the split random access channel format of FIG. 4.

FIG. 6 is a simulation plot showing the improvement in frequency estimates and the click noise spikes 60 caused by ambiguities in the split continuous wave spectrum 52 when the incorrect peak is selected. After the click noise spikes 60 are rejected, according to a method illustrated in FIG. 7, the remaining RMS error 62 is much smaller for the split continuous wave spectra 52 than it is for the contiguous continuous wave spectra 54.

FIG. 7 shows the simulated time correlation value at correct epoch versus frequency error for the burst format in FIG. 4. From this figure we see that the time correlation will work well if the frequency error is within 40 Hz. To use the multi-hypothesis testing (MHT) processing, there is about 10dB difference of correlation between the two adjacent frequency correction versions.

Figure 8:
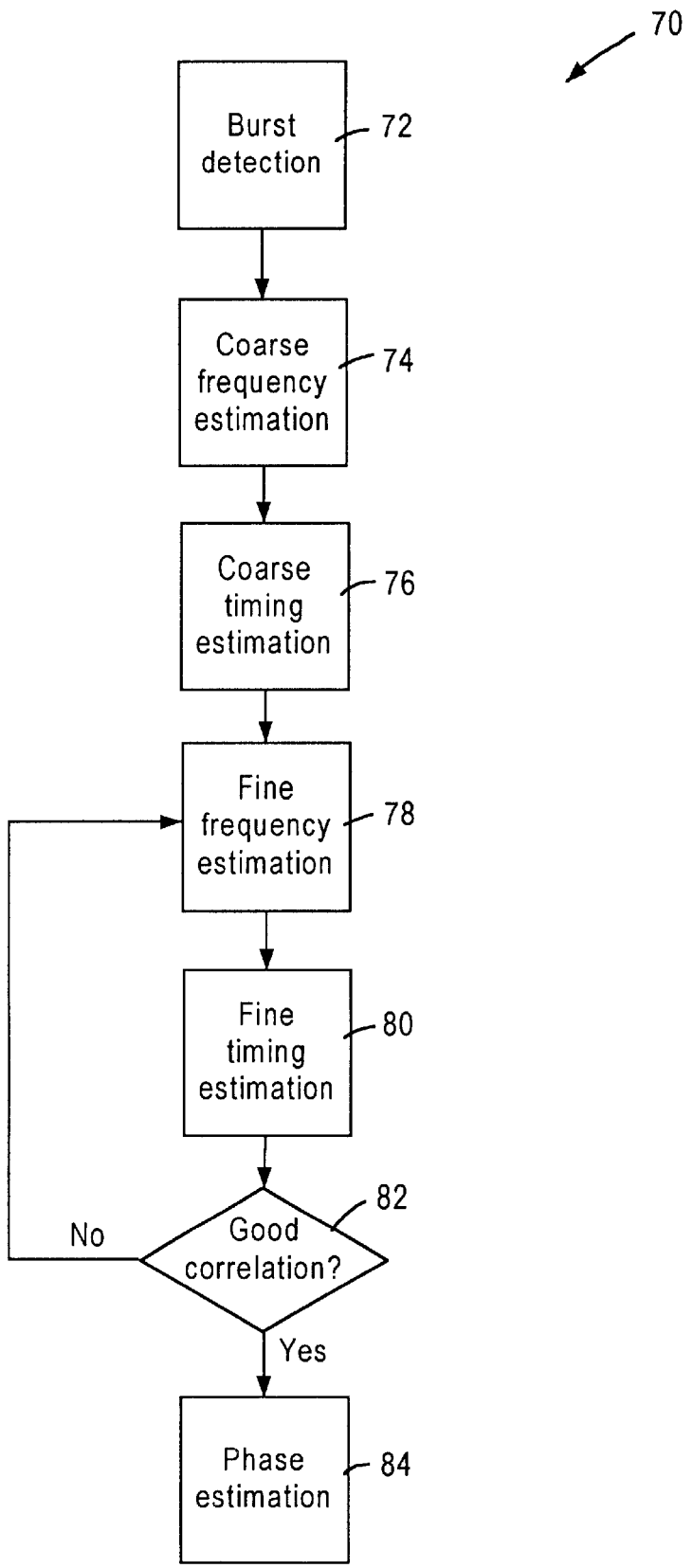
FIG. 8 illustrates a flow chart, which represents a program that can be implemented by the detection hardware of FIG. 2.

FIG. 8 illustrates a program 70 which may be implemented by the detection circuit 26 of FIG. 2. Specifically, the burst detector 36 (e.g., a DSP) may use the program 70 to accurately estimate the frequency and timing offsets of a detected burst. Step-wise refinement is used because the initial frequency and timing uncertainties are too large for the demodulator to work effectively.

The program 70 detects the presence of a random access channel burst at a block 72 using the continuous wave portion 18 of the data packet 20. A frequency domain correlation is performed using a plurality of coarse Discrete Fourier Transform filters covering an initial range of frequencies. The filtering function is preferably implemented using a digital signal processor as is well known to persons of ordinary skill in the art. However, the filtering function could also be implemented using discrete filters as is well known. Preferably, the initial range of frequencies encompasses the eventual outcome of the frequency estimation. The filter magnitudes are thresholded using well known constant false alarm rate (CFAR) techniques. An alert occurs whenever a filter magnitude exceeds the CFAR threshold, indicating the potential presence of a reference burst. At a block 74, the center frequency of the detection filter provides the receiver with a coarse estimate of the unknown frequency offset. At a block 76 a coarse timing estimate is obtained by continuing to monitor the detection filter after the alert and determining the sample point of the peak filter response.

At block 78, the program 70 performs a fine frequency estimation by interpolating the filter response from the detection filter and its neighbors at the acquired sampling time. Known interpolation methods include zero-padded Discrete Fourier Transforms, fractional Discrete Fourier Transforms, and quadratic minimum mean squared error fits. At a block 80, fine timing estimation is performed by correlating the frequency corrected received data against a template representing both the continuous wave and any unique word or known Barker sequence. Because Barker sequences have excellent cross correlation properties, the response is a narrow peak, allowing precise estimation of the correct sampling time. Since the accuracy of the fine timing estimation 80 depends on the residual frequency error and vice versa, the fine timing 80 and fine frequency 78 estimations may be done iteratively, as decided by a block 82, to improve performance further. Multiple hypothesis testing (MHT) is used to eliminate the click noise spikes 60 by performing the fine timing estimation step 80 for the maximum amplitude peak and both of its nearest neighbors. Each of the incorrect peaks will result in an uncompensated frequency offset so large that the correlation against the random access channel's unique word will be poor. In the unlikely event that the true peak is not among the three candidates, all three unique word correlations will be poor and the burst detection will be rejected, because the best correlation does not meet a minimum acceptable threshold or is significantly stronger than the other two correlation magnitudes. Of course, the multiple hypothesis approach could be generalized to N peak candidates to correct all errors.

When the block 82 determines the correlation is of sufficient magnitude, the phase can be estimated and passed along to the demodulator at a block 84. The phase is estimated by taking the known portions of the frequency corrected receive data, namely the continuous wave and unique word segments, along with the fine timing estimate and performing minimum mean squared error techniques.

Certain modifications of the present invention have been discussed above. Other modifications will occur to those skilled in the art of the present invention. For example, the ratio and mixture of the continuous wave portion and the data portion of the reference burst could be varied and optimized in numerous ways. For instance, an arrangement comprising half of the continuous wave symbols, followed by half of the random access channel symbols, followed by the other half of the continuous wave symbols, followed by the other half of the random access channel symbols, achieves most of the benefits of increased timing and frequency estimation, but requires less processing complexity.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of formatting a digitally transmitted message to improve detection comprising the steps of:
   separating a continuous wave segment into at least two parts;
   separating said continuous wave segment parts by some portion of a message content; and
   separating unique word symbols.

2. The method of claim 1, wherein said portion of message content comprises some portion of the content of a random access channel burst.

3. A method of estimating the frequency of a random access channel burst comprising the steps of:
   detecting the presence of said random access channel burst using a continuous wave segment of a data packet; and
   estimating the frequency by detecting a center frequency of said continuous wave segment.

4. The method of claim 3, wherein said step of detecting the presence of said random access channel burst using the continuous wave segment of a data packet comprises using a plurality of filters.

5. The method of claim 4, wherein said plurality of filters comprise coarse Discrete Fourier Transform filters.

6. The method of claim 4, further comprising the step of performing a fine frequency estimation by interpolating a filter response from at least two detection filters at the acquired sampling time.

7. The method of claim 5, further comprising the step of thresholding a magnitude from a detection filter using constant false alarm rate (CFAR) techniques.

8. The method of claim 6, wherein said interpolation comprises zero-padded Discrete Fourier Transformation.

9. The method of claim 6, wherein said interpolation comprises fractional Discrete Fourier Transformation.

10. The method of claim 6, wherein said interpolation comprises quadratic minimum mean squared error fits.

11. The method of claim 7, further comprising the step of performing a fine frequency estimation by interpolating a response from a detection filter and an adjacent detection filter at the required sampling time.

12. The method of claim 11, wherein said interpolation comprises zero-padded Discrete Fourier Transformation.

13. The method of claim 11, wherein said interpolation comprises fractional Discrete Fourier Transformation.

14. The method of claim 11, wherein said interpolation comprises quadratic minimum mean squared error fits.

15. A method of estimating the timing of a random access channel burst comprising the steps of:
- detecting the presence of said random access channel burst using a continuous wave segment of a data packet using a plurality of detection filters; and,
- estimating the timing of said random access channel burst by continuing to monitor at least one of said detection filters after detecting a constant false alarm rate alert and determining a sample point of a peak filter response.

16. The method of claim 15, further comprising the step of correlating a frequency-corrected received data segment against a predefined continuous wave segment.

17. The method of claim 15, further comprising the step of correlating a frequency corrected received data segment against a predefined unique word segment.

18. The method of claim 16, further comprising the step of multiple hypothesis testing in which the timing estimation process is performed for more than one of the detection filter outputs, corresponding to different frequencies.

19. The method of claim 17, further comprising the step of multiple hypothesis testing in which the timing estimation process is performed for more than one of the detection filter outputs, corresponding to different frequencies.

20. The method of claim 18, wherein the signal with the strongest correlation magnitude is determined and whose frequency is selected as most representative of the received signal's frequency offset.

21. The method of claim 19, wherein the signal with the strongest correlation magnitude is determined and whose frequency is selected as most representative of the received signal's frequency offset.

22. The method of claim 20, wherein said strongest correlation magriitude meets a minimum acceptable threshold.

23. The method of claim 21, wherein said strongest correlation magnitude meets a minimum acceptable threshold.

24. A method for estimating the frequency or timing of a random access channel burst comprising the steps of:
- detecting the presence of said random access channel burst using a continuous wave segment of a data packet,
- estimating the frequency by detecting a center frequency of said continuous wave segment using a plurality of filters;
- estimating the timing of said random access channel burst by continuing to monitor at least one of said detection filters after detecting a constant false alarm rate alert and determining a sample point of a peak filter response;
- performing a fine frequency estimation by interpolating a filter response from a detection filter and at least one other filter at the acquired sampling time;
- correlating a timing-corrected received data segment against a predefined continuous wave segment to refine the frequency estimate;
- correlating a frequency-corrected received data segment against a predefined unique word segment to refine the timing estimate; and, iterating between said correlation steps to refine frequency and timing estimates.

25. The method of claim 24, further comprising the step of estimating a phase by taking said continuous wave segment and said unique word segment, along with said fine timing estimate and performing a minimum mean squared error technique.

* * * * *